United States Patent [19]

Akashi et al.

[11] Patent Number: 4,617,459
[45] Date of Patent: Oct. 14, 1986

[54] AUTOMATIC FOCUSING DEVICE WITH LOW LIGHT CONTRAST INHIBITING MEANS

[75] Inventors: Akira Akashi; Masanori Yamada, both of Kanagawa, Japan

[73] Assignee: Canon Kabushiki Kaisha, Tokyo, Japan

[21] Appl. No.: 558,776

[22] Filed: Dec. 6, 1983

[30] Foreign Application Priority Data

Jun. 12, 1982 [JP] Japan ............... 57-213716

[51] Int. Cl.⁴ ............................ G01J 1/20
[52] U.S. Cl. ..................... 250/201; 250/204
[58] Field of Search ........... 356/1, 4; 250/201 AF, 250/201 PF, 201, 204; 354/400-404

[56] References Cited

U.S. PATENT DOCUMENTS

| | | | |
|---|---|---|---|
| 4,247,762 | 1/1981 | Wilwerding | 250/204 |
| 4,250,377 | 2/1981 | Wilwerding | 250/204 |
| 4,333,007 | 6/1982 | Langlais et al. | 250/204 |
| 4,358,675 | 11/1982 | Frazier et al. | 250/204 |
| 4,394,569 | 7/1983 | Nakamura | 250/204 |

Primary Examiner—David C. Nelms
Assistant Examiner—Stephone B. Allen
Attorney, Agent, or Firm—Toren, McGeady, Stanger, Goldberg & Kiel

[57] ABSTRACT

When the disclosed automatic focusing device detects that a computed distance measurement is inaccurate, it shifts the lens a predetermined length to a new position for another measurement. A system senses when the inaccuracy arises from an overly dim scene, for which a distance cannot be properly measured in any case, and inhibits the successive shifts to avoid waste of energy.

4 Claims, 8 Drawing Figures

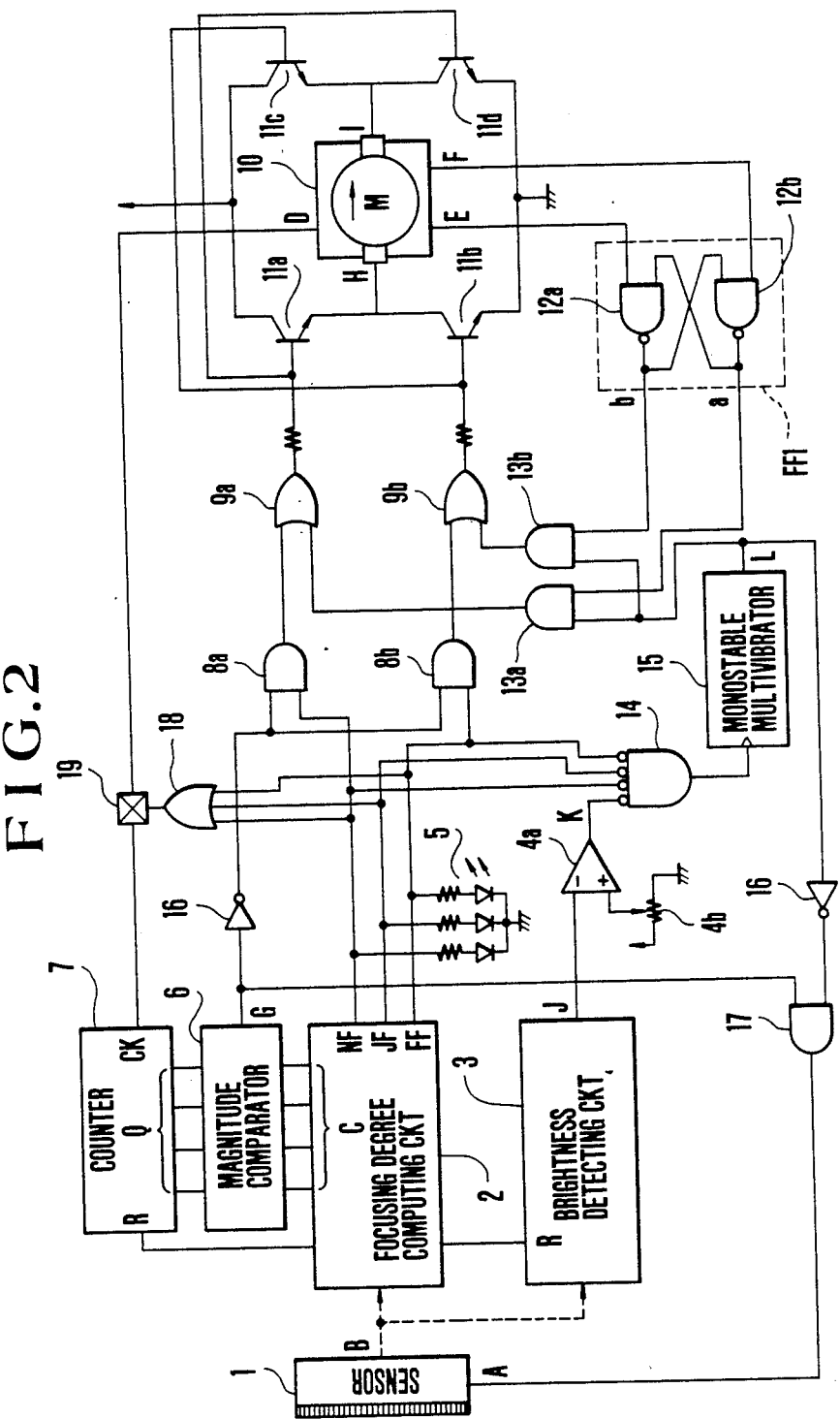

FOCAL POINT OBTAINED BY ADJUSTING THE LENS
A0 (ACTUAL IN-FOCUS POINT)

AUTOMATIC FOCUSING DEVICE WITH LOW LIGHT CONTRAST INHIBITING MEANS

BACKGROUND OF THE INVENTION

1. Field of the Invention

This invention relates to an automatic focusing device in which a sensor is arranged to receive the image of an object to be photographed; the degree and the direction of deviation from an in-focus point position, i.e. a focusing degree focusing error, is computed on the basis of an image signal produced from the sensor; and automatic focusing is accomplished by driving a lens to an in-focus position according to the result of the computation.

2. Description of the Prior Art

An ideal automatic focusing device should be capable of computing a focusing error under any condition on the basis of an image signal obtained from the sensor. In actuality, however, it becomes impossible to compute a focusing error where the error is excessive, where the contrast of an object to be photographed is low (hereinafter called a low contrast) or where the brightness of the object is low (hereinafter called a low brightness). To solve this problem, a proposal has been made for a mechanism to shift the lens a predetermined extent in the event that computation of focusing error is impossible, then to try computation with the lens at the position to which it has been thus shifted; and, if the computation is still impossible there, the lens is again shifted the predetermined extent. In this manner, the lens is repeatedly shifted a predetermined amount until it reaches a lens position whose focusing error is computable. However, where the focusing error computation is impossible due to low brightness, it is fundamentally unfeasable to obtain the focusing error even with the lens position repeatedly shifted to a predetermined extent in the above-stated manner. In that case, the effect of the searching mechanism of the prior art device has been unreliable and often resulted in waste of time and electrical energy.

SUMMARY OF THE INVENTION

An object of the present invention is to provide an automatic focusing device which is capable of solving the above-stated problems of the prior art and in which there is provided a circuit for computing the brightness of an object to be photographed; and no searching action is performed when the computed value obtained by the brightness computing circuit is lower than a predetermined value, so that the electric energy and time can be saved from being wasted.

Hereinafter, an action shift the lens to a predetermined extent irrespective of the result of computation performed in case the focusing error is barely detectable is called a searching action.

The above and further objects and feature of the invention will become apparent from the following detailed description of a preferred embodiment thereof taken in connection with the accompanying drawings.

BRIEF DESCRIPTION OF THE DRAWINGS

FIG. 2 is a circuit diagram showing the focusing device as an example of embodiment of the invention.

DETAILED DESCRIPTION OF THE PREFERRED EMBODIMENT

Figure 1:
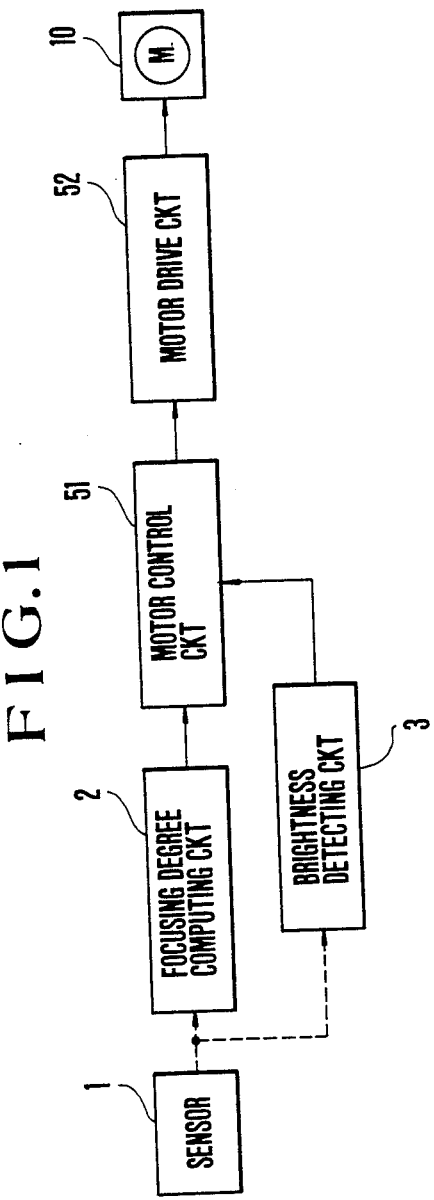
FIG. 1 is a block diagram showing the basic arrangement of a focusing device according to the present invention.

In FIG. 1 which shows a block diagram of an automatic focusing device embodying the invention, the embodiment is arranged and operates as follows: A sensor 1 is a storage type self-scanning element (CCD) and is positioned on a focal plane. The sensor 1 accumulates an image signal there. When the quantity of the signal accumulation reaches a predetermined amount, the image signal is serially transferred to a focusing degree computing circuit 2. In the drawing, broken lines represent the serial image signal. Upon receipt of the image signal, the focusing degree computing circuit 2 determines a near-focus, in-focus or far-focus condition from the image signal and also quantitatively computes an out-of-focus degree i.e. focusing error. The distance measurement information thus obtained is supplied to a motor control circuit 51. (Hereinafter the above-stated series of actions for obtaining information on a measured distance is called a distance measuring action.) The motor control circuit 51 controls the driving action on a motor 10 according to the measured distance information supplied thereto. In response to this control, a lens (not shown) is shifted by the motor 10 to a correct position where an in-focus state obtains.

The above-stated sequence of actions including the distance measuring action and the lens driving action are arranged to be repeated to adjust the position of the lens in pursuit of an in-focus condition even when the object to be photographed is kept on the move, so that the lens can be kept in focus.

The operation of the embodiment is performed in the above-stated manner only when the focusing degree i.e. error is detectable. In performing distance measurement, the imaging state by the sensor would become excessively blurred or the contrast of the object would become excessively low (low contrast) if the lens were in a position excessively far away from an in-focus position. In that instance, the accuracy of the result of the focusing degree computation performed by the focusing degree computing circuit 2 on the basis of the output of the sensor 1 is degraded to a great degree and distance measurement becomes impossible. Under such a distance immeasurable condition, i.e. when the lens position is outside of a distance measurable range and is far away from an in-focus point, the operation described in the foregoing is changed as follows: The motor control circuit 51 causes the motor to shift the lens a predetermined extent. Distance measurement is carried out with the lens in that shifted position. If distance measurement is still impossible with the lens there, the lens is again shifted to the predetermined extent. The searching action is thus repeated, so that the lens can be shifted closer to the in-focus point by repeatedly shifting it the predetermined extent at a time even in the event of the excessive blurred condition or the low contrast condition. After the lens has been thus shifted from an unmeasurable distance range to a measurable distance range, the embodiment operates in the same manner as described in the foregoing to automatically bring the lens into focus. The above-stated distance unmeasurable condition arises not only when the lens is in a position far from the in-focus position but also arises when the brightness of an object to be photographed drops (low brightness). In the latter case, this condition never can be shifted to a distance measurable condition by repeatedly shifting the lens to the predetermined extent at a time unless the brightness increases. Therefore, in accordance with this invention, the embodiment is provided with a brightness detecting circuit 3. Such low brightness is detected by the brightness detecting circuit 3. A low brightness signal is then supplied to the motor control circuit 51 to render the motor 10 inoperative under the low brightness condition. In dim light where distance measurement is intrinsically impossible, the motor driving action is thus inhibited to save electric energy from being wasted. Meanwhile, in that instance, the above-stated distance measuring operation is repeatedly performed. Therefore, when the object changes to a higher brightness, the above-stated motor driving action is released from the inhibited state and the lens is driven according to the result of distance measurement until the lens is automatically shifted to the in-focus state in the same manner as described in the foregoing.

Figure 3:
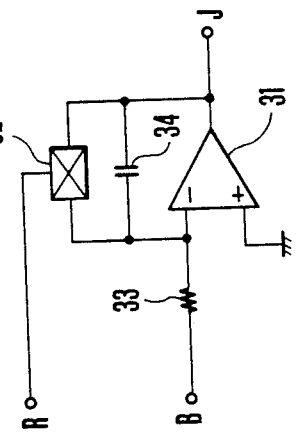
FIG. 3 is a circuit diagram showing by way of example the details of a brightness detecting circuit shown in FIG. 2.

An example of the circuit arrangement of the focusing device according to the present invention is shown in FIG. 2. In FIG. 2, the circuit arrangement includes the sensor 1 which is a storage type self-scanning element (CCD line sensor) and is disposed in a position equivalent to a focal plane in the optical path of a photo taking lens. The sensor 1 receives power when a signal A is at a high level (hereinafter called the H level). After receipt of power supply, the sensor 1 accumulates electric charge for every predetermined period of time. After the electric charge has been accumulated for the predetermined period of time, the sensor 1 produces an image signal in a serial manner. This serial signal is represented by a broken line in FIG. 2. A focusing degree computing circuit 2 computes a focusing degree on the basis of the image signal serially supplied from the sensor 1. If the result of computation is a near-focus state, the level of an output NF of the circuit 2 becomes high. If it is an in-focus state, the level of an output JF of the circuit 2 becomes high. If it is a far-focus state, the level of another output FF of the circuit 2 becomes high. In the event that the focusing state cannot be determined due to an excessive out-of-focus degree, etc., the levels of all the outputs of the circuit 2 become a low level (hereinafter after called the L level). A reference numeral 5 denotes a display device consisting of LED's or the like. The circuit 2 also quantitatively computes the out-of-focus degree and produces from the output terminals C thereof a digital value corresponding to the degree of out-of-focus, i.e. a lens shifting extent required in shifting the lens to an in-focus position. In the event that the focusing state is undetectable, the levels of all the outputs from the terminals C become an L level. A brightness detecting circuit 3 is arranged to be reset by the focusing degree computing circuit 2 immediately before the image signal is supplied thereto. The circuit 3 then computes the brightness level of the object to be photographed and produces an analog output as a result of the brightness computation. For example, an integration circuit provided with a reset mechanism as shown in FIG. 3 may be used as the brightness detecting circuit 3. In FIG. 3, the integration circuit includes an operational amplifier 31; a resetting analog switch 32 which is arranged to be reset when the level of a terminal R is H level; and a resistor 33 and a capacitor 34 which determine the time constant of integration. Again in to FIG. 2, a counter 7 is arranged to receive a pulse signal D as a clock input via an analog switch 19 from a member (not shown) arranged at a lens shifting motor 10 to produce a pulse signal consisting of a number of pulses corresponding to a lens shifting extent. A magnitude comparator 6 is arranged to receive the out-of-focus degree digital signal C of the focusing degree computing circuit 2 and the output Q of the lens shifting extent counter 7. The magnitude comparator 6 makes the level of its output G, go high (H) when the two inputs coincide with each other and makes it go low (L) when they do not coincide. The reset terminal R of the counter 7 is connected to the focusing degree computing circuit 2. Upon completion of computation by the computing circuit 2, an H level signal is impressed on the reset terminal R to reset the counter 7. AND circuits 8a and 8b and OR circuits 9a and 9b form a drive control circuit which supplies a drive control signal to the motor 10. Transistors 11a–11d form a motor drive circuit which controls the normal or reverse rotation of the motor 10. The drive circuit drives the motor on the basis of the above-stated drive control signal. A comparator 4a compares the output J of the above-stated brightness detecting circuit 3 with a reference level set at a resistor 4b which serves as level setting means. A NOR circuit 14 is arranged to produce an H level output to actuate a searching function when computation of the focusing degree is impossible, that is, when the levels of all the outputs NF, JF and FF of the focusing degree computing circuit 2 are L levels while a high brightness degree is detected by the comparator 4a. The NOR circuit 14 produces an L level output to render the searching function inoperative when a low brightness degree is detected by the comparator 4a. A search function selection circuit is thus formed by the NOR circuit 14. Meanwhile, the reference level set at the resistor 4b is set at a value corresponding to a minimum brightness level that permits the focusing degree computation. A monostable multivibrator 15 is arranged to produce an H level signal for a predetermined period of time when an input thereof rises, i.e. when the searching function is selected. This period of time is of a length required for lens shifting per search action. The output terminal L of the monostable multivibrator 15 is connected to AND circuits 13a and 13b and further to the motor drive circuit via the OR circuits 9a and 9b. Other input terminals of the AND circuits 13a and 13b are connected to the output terminals of a flip-flop circuit FF1 which consists of NAND circuits 12a and 12b. The input terminals of the flip-flop circuit FF1 for input signals E and F are connected to an end detecting member (not shown) arranged either at the motor or at the lens. This member is composed of either a sensor or a switch or the like and is arranged to make the level of either the signal E or F low (L) when the lens comes to either an infinity distance position or a nearest distance position and to make the levels of both the signals E and F high (H) when the lens is in any position other than these end positions. With the level of either the signal E or the signal F becoming an L level, the outputs of the flip-flop FF1 are inverted. Then, the AND circuits 13a and 13b which are arranged to receive the outputs shift the transmission of the output signal L of the monostable multivibrator 15 to the OR circuit 9a or to the other OR circuit 9b. Accordingly, in case that the focusing degree computation is impossible while the object brightness is sufficiently high, the searching action is performed by driving the motor in one of the two directions for a period of time during which the output of the monostable multivibrator 15 remains at an H level. When the lens is shifted to one end position, the end detecting member inverts the flip-flop FF1. The direction of power supply to the motor is reversed and the lens is shifted in the reverse direction from the above-stated end position. A search control circuit is formed by the above-stated monostable multivibrator 15 and the AND circuits 13a and 13b. A reference numeral 17 denotes an AND circuit which has one input terminal thereof connected to the output terminal G of the comparator 6 and the other input terminal thereof to the monostable multivibrator 15 via an inverter 16. The AND circuit 17 is arranged to produce an L level output while the lens is being shifted and to produce an H level output upon completion of lens shifting.

Figure 4:
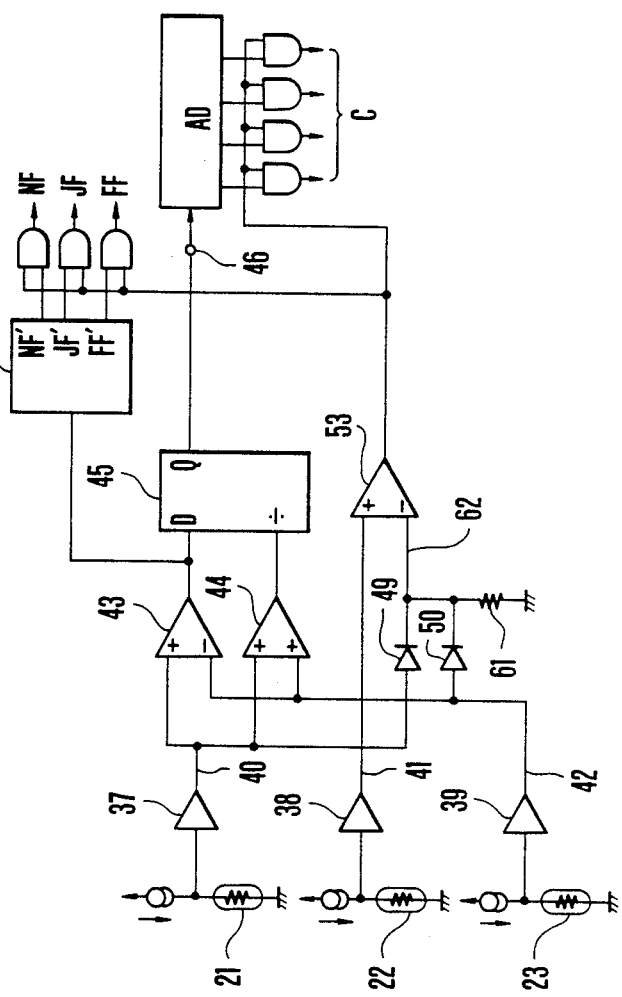
FIG. 4 is a circuit diagrem showing by way of example the details of a computing circuit and a sensor shown in FIG. 2.
Figure 5A:
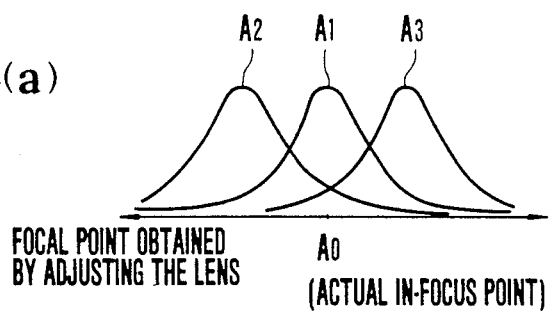
FIGS. 5(a), (b), (c) and (d) are wave form charts showing the computing operation of the embodiment.
Figure 5B:
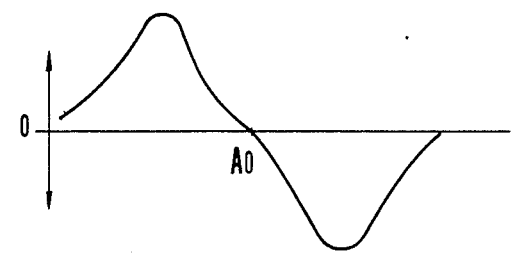
Figure 5C:
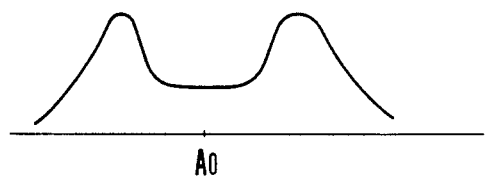
Figure 5D:
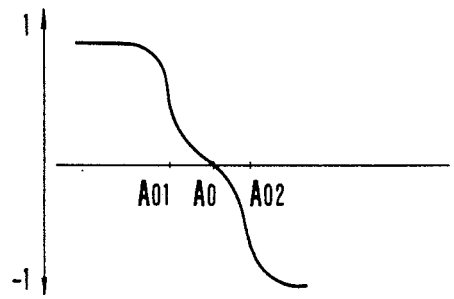

FIG. 4 is a circuit diagram showing by way of example the details of the sensor 1 and the focusing degree computing circuit 2 shown in FIG. 2. Referring to FIG. 4, the sensor 1 consists of three sensor elements 21, 22 and 23. The sensor element 22 is disposed in a position equivalent to a focal plane. The sensor element 21 is disposed in a position equivalent to a near-focus plane located in front of the focal plane. The sensor element 23 is disposed in a position equivalent to a far-focus plane located in the rear of the focal plane. With the sensor elements disposed in this manner, the outputs of the sensor 1 (sharpness signals) produced from the above-stated different positions are amplified by amplifiers 37, 38 and 39. Thus, signals representative of image sharpness obtained in front of an expected focal plane, on the expected focal plane and in rear of the expected focal plane are produced at lines 40, 41 and 42 respectively. Of these signals, the signals of lines 40 and 42 are supplied to a differential amplifier 43 to obtain a difference in sharpness between the images obtained in front and in rear of the expected imaging plane. At the same time, the sum of image sharpness obtained in front of the imaging plane and the image sharpness obtained in the rear thereof is obtained by an addition amplifier 44. The outputs of the amplifiers 43 and 44 are supplied to a divider 45. The divider 45 divides the difference thus obtained by the sum thus obtained to determine the sharpness of the object image. The divider 45 then produces a signal representing a defocus (or out-of-focus) degree to a terminal 46. More specifically, referring to FIG. 5, let us assume that the output (a sharpness signal) of the line 41 is changing as represented by a wave form A1, that of the line 40 as represented by a wave form A2 and that of the line 42 as represented by another wave form A3 in FIG. 5(a). Since the amplifier 43 is arranged to obtain the difference between the outputs of the lines 40 and 42 as mentioned above, a resultant difference signal becomes as shown in FIG. 5(b). The amplifier 44, on the other hand, is arranged to obtain the sum of the outputs of the lines 40 and 42. A resultant sum thus obtained becomes as shown in FIG. 5(c). With the value of the wave form of FIG. 5(b) divided by the value of the wave form of FIG. 5(c), therefore, the output of the divider 45 becomes as shown in FIG. 5(d). As apparent from the wave form of FIG. 5(d), this output of the divider 45 is a functional signal which shows a minimum value at an in-focus point A0 and increases (in absolute value) according as the extent of deviation from the in-focus point increases. The output of the divider 45 thus permits computation of the defocus degree from the in-focus point and the computed value thus obtained is digitized by an A-D converter.

The output of the above-stated amplifier 43 is supplied to a window comparator 47 to have the focusing direction detected thereby. In other words, when the level of the output of the line 40 is higher than the output level of the line 42, an imaging state obtains at a point before the in-focus point. Therefore, when the sharpness obtained at a position in front of the in-focus point, i.e. in the region on the left side of the in-focus point A0 in FIG. 5(a), is higher than the sharpness obtained at the in-focus point, the amplifier 43 produces a positive output as shown in FIG. 5(b). Therefore, in that instance, the window comparator 47 produces a high level output from the terminal NF' thereof. The high level output from the terminal NF' instructs that the lens be shifted from a near-focus position (a state having the object image formed in front of the in-focus point) toward a far-focus position (a state having the image formed in rear of the in-focus point). Conversely, when the output level of the line 40 is lower than that of the line 42, i.e. when the imaging state obtains within a region on the right side of the in-focus point A0 in FIG. 5(a), the amplifier 43 produces a negative signal as shown in FIG. 5(b). In this instance, the window comparator 47 produces a high level output from the terminal FF' thereof to instruct that the lens be shifted from a far-focus position toward a near-focus position. Further, when the output of the amplifier 43 becomes almost zero, the window comparator 43 produces a high level output from the terminal JF' thereof. The focusing direction and the defocus degree are both detected in this manner. However, in the event that the imaging point is not at any internally dividing points of the front and rear sensors 21 and 23, the defocus degree to be produced from the terminal 46 cannot be accurately obtained. Besides, if the whole image is blurred to an excessive degree at the positions 4, 5 and 6, defocus can hardly be determined. To solve this problem, diodes 49 and 50 and a resistor 61 are arranged to obtain one of the sharpness signals from the lines 40 and 42 having a higher level than the other and to produce it to a line 62. This signal of line 62 is compared at a comparator 53 with the signal from the line 41, i.e. the sharpness signal of the expected focal plane. Then, if the sharpness at the expected focal plane is found higher than the sharpness at a plane in front or in rear of the expected focal plane, that is, when the defocus degree obtained at the above-stated terminal 46 is an accurate value (or established value), a high level output is produced from the comparator 53. As shown in FIG. 5(d), the defocus degree can be obtained as function in the neighborhood of the in-focus point A0. However, when the defocus degree exceeds a certain given deviation degree from the in-focus point in the region either on the left or right side as shown in FIG. 5(d), the signal representing the defocus degree no longer appears as an accurate function. Therefore, the comparator 53 is arranged to compare the output of the line 41 (A1 in FIG. 5(a)) with the outputs of lines 40 and 42 (A2 and A3 in FIG. 5(a)). When the signal is within the range between A01 and A02 as shown in FIG. 5(d), the comparator 53 produces a high level output to indicate that the defocus degree signal produced from the above-stated terminal 46 is of an accurate value. In any event other than that, the output level of the comparator 53 becomes low. The low level signal thus produced from the comparator 53 is supplied to AND gates disposed at the output terminals of an A-D converter AD to make the level of each output of the A-D converter low.

The embodiment which is arranged as shown in FIG. 2 operates as follows: In the initial stage of the operation, when the power source switch is turned on, the counter 7 and the brightness detecting circuit 3 are reset by a power-up-clear circuit, etc. The focusing degree computing circuit 2 is in a cleared state and all the output terminals C are producing L level outputs. Under this condition, the output Q and the output C of the computing circuit 2 are coinciding with each other. Therefore, the comparator 6 is producing the output G at an H level. Since the monostable multivibrator 15 is inoperative, the output of the inverter 16 is also at an H level. With the power source switched on, therefore, the AND circuit 17 produces an H level output. Accordingly, the sensor 1 begins to accumulate an image signal. After that, the image signal is transferred to the computing circuit 2 and the brightness detecting circuit 3. At the beginning of transfer of the image signal, an H level input is momentarily impressed on the terminal R of the brightness detecting circuit 3. Therefore, the switch 32 shown in FIG. 3 turns on when the image signal is transferred to the circuit 3. This resets the capacitor 34. The capacitor 34 then integrates the image signal from the reset state. The integration output of the capacitor 34 corresponds to the integrated amount of the image signal resulting from the light received by the sensor 1. Therefore, the capacitor 34 produces a high level output when the brightness of the object is high and a low level output when the brightness is low.

The focusing degree computing circuit 2 computes the focusing degree on the basis of the image signal. The circuit 2 thus detects a near-focus state, a far-focus state or an in-focus state and also produces an output C which is a digital value corresponding to an out-of-focus (or defocus) degree.

When the lens position is within a distance measurable range and the object to be photographed is in a high brightness state, that is, under a distance measurable condition, the computing circuit 2 makes the level of one of the outputs NF, JF and FF high (H) as applicable and also produces a defocus degree value from the terminal C thereof. In case that the result of distance measurement becomes a near-focus state, an H level output is produced from the terminal NF and is supplied to the AND gate 8a. The counter 7 has been again reset when the computation is completed by the computing circuit 2. Therefore, there obtains a relation of the output C>the output Q. The comparator 6 is thus producing the output G at an L level when the above-stated computing action comes to an end. Accordingly, the output level of the inverter 16 becomes an H level. Since this H level output of the inverter 16 is supplied to the other input terminal of the AND gate 8a, the AND gate 8a produces an H level output. The H level output of the AND gate 8a turns the transistors 11a and 11d on. The motor 10 rotates in the direction of arrow to shift the lens toward a far-focus position. The analog switch 19 turns on in response to the H level output NF supplied thereto via the OR circuit 18. Therefore, when a number of pulses corresponding to the extent to which the lens is shifted by the rotation of the motor 10 are produced from the terminal D, the counter 7 counts the pulses. When the lens comes to an in-focus position after having been shifted from the near-focus position toward a far-focus position, the count value of the counter 7 coincides with the digital value of the output C of the computing circuit 2. The comparator 6, therefore, produces the output G at an H level. The H level output G then turns the output level of the AND circuit 8a into an L level. The driving operation on the motor 10 by the transistors 11a and 11d is brought to a stop. The lens, therefore, ceases to be driven by the motor when it comes to the in-focus position. With the lens driving action coming to an end, the level of the output G of the comparator 6 becomes high (H) as mentioned in the foregoing. The AND circuit 17, therefore, again produces an H level output. This causes the sensor 1 to again begin to accumulate an image signal. After that, the above-stated distance measuring and lens driving actions are repeated, so that the lens can be always shifted to the in-focus position even when the object is kept on the move.

When a far-focus state is found through distance measurement, the output FF of the computing circuit 2 is at an H level. In this case, therefore, the AND circuit 8b produces an H level output. The transistors 11c and 11d turn on to cause the motor to rotate in the direction reverse to the rotating direction for the above-stated near-focus state. After that, the lens is driven to move to an in-focus position in the same manner as in the case of the near-focus state.

Further, if there obtains an in-focus state as a result of distance measurement, it is only the output JF that becomes an H level at the computing circuit 2. The output levels of the AND circuits 8a and 8b, therefore, remain at an L level. As a result, the motor is not driven and the lens is kept in the in-focus position.

Under the distance measurable conditions, as described above, the lens is driven and shifted to an in-focus position according to the result of computation by the computing circuit 2 (result of distance measurement). However, if distance measurement is impossible, the embodiment operates as follows:

First, let us consider a case where the brightness of the object is high and where distance measurement is impossible, that is, where the position of the lens is far away from an in-focus position and there obtains an excessively blurred or low contrast condition. In that event, as a result of computation by the computing circuit 2, L level outputs are produced from the terminals NF, JF and FF. The levels of all the outputs C also becomes an L level. Since the brightness is high, the brightness detecting circuit 3 is producing a high level signal and the comparator 4a produces an L level output. Therefore, the outputs of the AND circuits 8a and 8b are kept at an L level. The NOR circuit 14 on the other hand produces an H level output to render the monostable multivibrator operative. The level of the output L of the monostable multivibrator 15 thus comes to remain at an H level for a predetermined period of time. This H level of the output L then causes one of the AND circuits 13a and 13b to produce an H level output. Therefore, the motor 10 is driven either in the direction of arrow or in the direction reverse thereto while the output of the monostable multivibrator 15 is at the H level. The motor 10 thus shifts the lens to a predetermined extent. After the lens is thus shifted to the predetermined extent, either the AND circuit 13a or 13b comes to produce an L level output to stop the motor 10 from driving the lens when the output of the multivibrator 15 becomes an L level. Then, the AND circuit 17 again has an H level signal impressed on one of the input terminals via the inverter 16. At this instant, all the terminals NF, JF and FF of the computing circuit 2 are producing L level outputs. Therefore, the switch 19 is off. The counter 7 is kept in its initial state despite the shift of the lens to the predetermined extent. As a result of that, the level of the output G of the comparator 6 is kept at an H level irrespective of the shift of the lens. Accordingly, with the output level of the monostable multivibrator 15 becoming low, the AND circuit 17 produces an H level output. Then, the sensor 1 again begins to accumulate an image signal. Following this, the distance measurement and the lens driving action to shift it to the predetermined extent are repeatedly carried out. In other words, a searching action is carried out.

During the searching action, when the lens is shifted and comes to a distance measurable range closer to the in-focus point, it becomes possible to detect through distance measurement whether the lens is in a near-focus, in-focus or far-focus state together with the out-of-focus degree. After that, therefore, the lens is shifted to an in-focus position in the same manner as described in detail in the foregoing concerning the operation under the distance measurable conditions.

In the event that distance measurement is impossible due to excessively low brightness, the embodiment operates as follows: As a result of distance measurement, the computing circuit 2 in this case also produces L level signals from all the terminals NF, JF, FF and C. Threfore, the AND circuits 8a and 8b also produce L level outputs and the motor driving action by the signal from the circuit 8a or 8b is inhibited. Further, since the brightness is low, the output J of the brightness detecting circuit 3 is at an L level. The comparator 4a produces a low brightness signal at an H level. This causes the NOR circuit 14 to produce an L level output. Therefore, the monostable multivibrator 15 is inoperative. The AND circuits 13a and 13b also produce L level outputs. The motor is not driven and the above-stated searching operation is thus inhibited in this case.

In this instance, as mentioned in detail above, the comparator 6 produces its output G at an H level when distance measurement is impossible. Therefore, the AND circuit 17 keeps on producing an H level output to permit the above-stated distance measurement to be performed in a repeated manner. Therefore, when the brightness changes from a low state to a high state, the output of the comparator 4a changes from the H level to an L level. Accordingly, either the above-stated searching action or the focusing operation is carried out. In other words, the searching operation is performed if distance measurement is still impossible even after the brightness has become high. If distance measurement is possible then, the lens is driven and shifted to an in-focus position according to the result of distance measurement.

The invented arrangement as described in detail above inhibits the searching action in the case of low brightness under a distance unmeasurable condition. This effectively saves the electric energy from being wasted by a useless motor driving action when a shift to a distance measurable condition is hardly possible by the searching action.

Further, in the embodiment described, brightness information is arranged to be obtained by detecting an image singl from the sensor. However, it goes without saying that this arrangement may be changed to another arrangement in which: A light sensitive element is arranged independently of the sensor and the brightness information is obtained by detecting the output level of this light sensitive element directly with the comparator 4a.

The sensor 1 mentioned in the foregoing is arranged to have power supply effected thereto when the output level of the AND gate (or circuit) 17 is high. The accumulating action by the sensor is performed for a predetermined period of time at predetermined time intervals. Meanwhile, a known CCD driver is arranged to drive the sensor to produce the electric charge accumulated there after the lapse of the predetermined period of time. The embodiment includes a one-shot circuit which operates in response to a signal produced from the known CCD driver indicating completion of the accumulatin action of the sensor. The one-shot circuit produces a pulse which, for example, resets the above-stated brightness detecting circuit. The embodiment further includes another one-shot circuit which is responsive to a CCD output transfer completion signal produced from the known CCD driver after completion of the transfer of the output of the CCD. A pulse produced from this one-shot circuit is used, for example, for resetting the above-stated counter.

As for the circuit arranged to produce the pulses according to the lens driving extent and to cause a signal produced from the output terminal EF of the motor circuit 10, the circuit may be arranged in a manner as disclosed, for example, in U.S. patent application Ser. No. 448,693.

Further, the pulses to be generated according to the lens driving extent may be generated by means of some mechanical switch that turns on and off according as the motor rotates.

What we claim:

1. An automatic focusing device having a detecting circuit for detecting an object by a sensor so as to calculate information concerning the amount of movement of a lens to an in-focus position on the basis of an output of the sensor and for detecting whether contrast of the object is low or not, and having a driving circuit for driving the lens in response to the information calculated by the detecting circuit so as to carry out the focusing operation, said device comprising:

(a) a control circuit for inhibiting the response of the driving circuit to the information when the detecting circuit detects that the contrast is low and for producing a driving signal for driving the lens irrespective of the information so as to operate the driving circuit by the signal;

(b) a detecting circuit for detecting a brightness level of the object; and (c) an inhibiting circuit for inhibiting the operation of the driving circuit when the detecting circuit detects that the brightness level is below a predetermined value.

2. An automatic focusing device having a detecting circuit for detecting an object by a sensor so as to calculate information concerning the amount of movement of the lens to an in-focus point in response to the output of the sensor and for detecting whether contrast of the oject is low or not, and having a driving circuit for driving the lens in response to the information calculated by the detecting circuit so as to carry out the focusing operation comprising:

(a) a control circuit for inhibiting the response of the driving circuit to the information when the detecting circuit detects that the contrast is low and producing a driving signal for driving the lens irrespective of the information so as to operate the driving circuit by the signal;

(b) a detecting circuit for detecting the brightness level of the object; and (c) an inhibiting circuit for inhibiting the control of the driving circuit by the control circuit when the low contrast is detected and the detecting circuit detects that the brightness level is below the predetermined value.

3. An automatic focusing device which detects an object by a sensor and drives a lens to an in-focus point according to an output of the sensor, comprising:

(a) a driving circuit which drives the lens in response to the output of the sensor when the detected circuit of the sensor is in a predetermined state in which the output of the sensor is suited for obtaining a focus information and drives the lens irrespective of the output of the sensor when the output of the sensor is not in the predetermined state;

(b) a detecting circuit for detecting a brightness level of the object; and (c) an inhibiting circuit which inhibits the operation of the driving circuit when the detecting circuit detects that the brightness level is below the predetermined value.

4. An automatic focusing device which detects an object by a sensor and drives a lens up to an in-focus point according to the output of the sensor comprising:

(a) a driving circuit for driving the lens is response to the output of the sensor when the detected output of the sensor is in a predetermined state in which the output of the sensor is suited for obtaining a focus information and driving the lens irrespective of the output of the sensor when the output of the sensor is not in the predetermined state;

(b) a detecting circuit for detecting a brightness level of the object; and (c) an inhibiting circuit which, when the detecting circuit detects that the brightness level is below a predetermined value, inhibits the driving by the driving circuit when the output of the sensor is not in the predetermined state.

* * * * *

UNITED STATES PATENT AND TRADEMARK OFFICE
CERTIFICATE OF CORRECTION

PATENT NO. : 4,617,459

DATED : October 14, 1986

INVENTOR(S) : Akira Akashi & Masanori Yamada

It is certified that error appears in the above-identified patent and that said Letters Patent is hereby corrected as shown below:

In the heading of the Patent, it should read:

--[30]  Foreign Application Priority Data

December 6, 1982 [JP]  Japan ............ 57-213716

Signed and Sealed this

Twentieth Day of October, 1987

Attest:

DONALD J. QUIGG

*Attesting Officer*  *Commissioner of Patents and Trademarks*